United States Patent [19]

Knott

[11] 3,990,772
[45] Nov. 9, 1976

[54] KALEIDOSCOPE
[76] Inventor: Philip H. Knott, 1 San Antonio Place, San Francisco, Calif. 94133
[22] Filed: Feb. 18, 1975
[21] Appl. No.: 550,513

[52] U.S. Cl. .................................. 350/5; 353/2
[51] Int. Cl.² ................................ G02B 27/08
[58] Field of Search ............... 350/4, 5; 353/1, 2

[56] References Cited
UNITED STATES PATENTS

| 754,143 | 3/1904 | Johnson | 350/5 |
|---|---|---|---|
| 1,662,743 | 3/1928 | Hanson | 350/5 |
| 2,727,426 | 12/1955 | Lopez | 350/5 |
| 3,242,799 | 3/1966 | Beverett | 350/5 |
| 3,748,013 | 7/1973 | Orans | 350/5 |

FOREIGN PATENTS OR APPLICATIONS

| 1,258,263 | 1/1968 | Germany | 350/4 |

Primary Examiner—L. T. Hix
Assistant Examiner—E. M. O'Connor
Attorney, Agent, or Firm—Flehr, Hohbach, Test, Albritton & Herbert

[57] ABSTRACT

A kaleidoscope wherein the admitted light is reflected into an otherwise darkened chamber which contains one or more varieties of reflective objects whose surfaces pick up the admitted light and reflect it in varying patterns between angled mirrors of the kaleidoscope in a reflecting tube. The color of the admitted light and thus the colors of the pattern may be selectively determined by the admission of only predetermined colors of light to the interior of the device. Apparatus is provided to filter the admitted light and reflect it to the reflective objects.

14 Claims, 6 Drawing Figures

U.S. Patent Nov. 9, 1976 Sheet 1 of 2 3,990,772
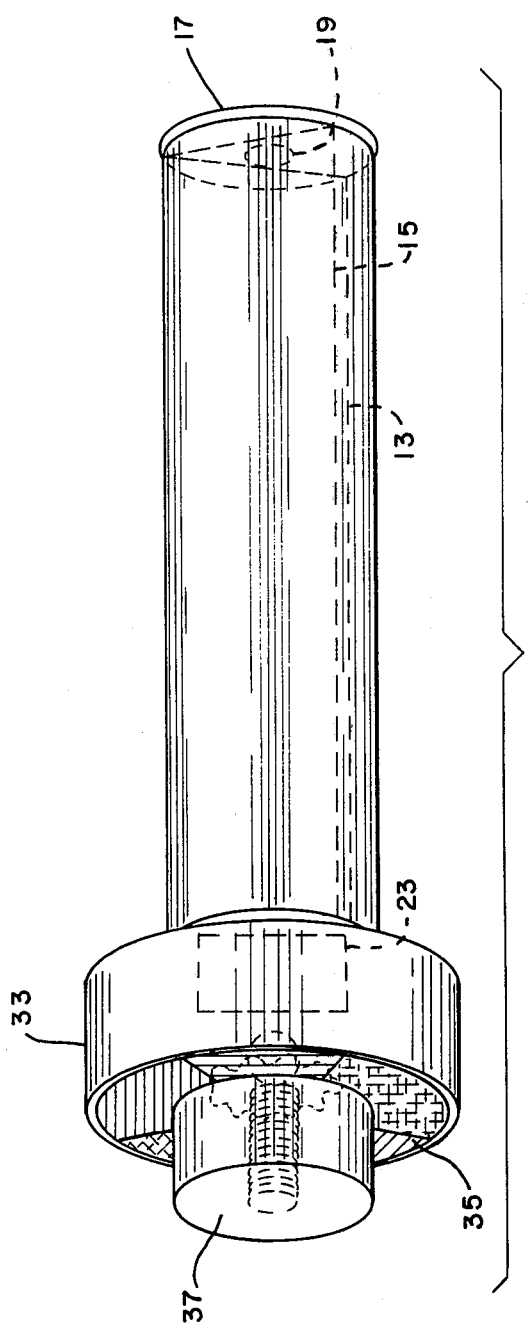
FIG.—1
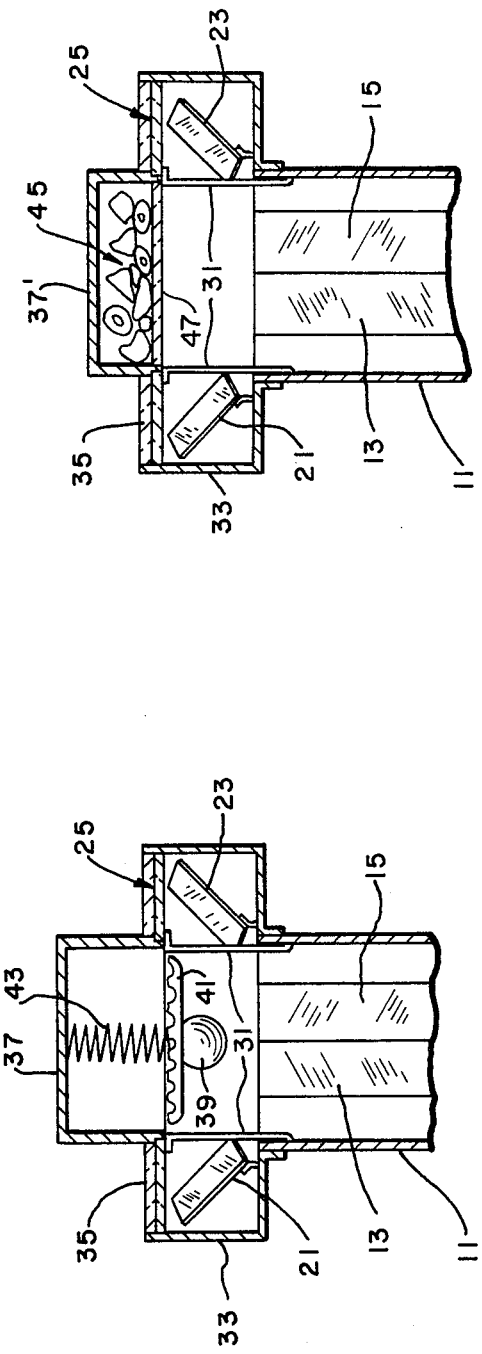
FIG.—2
FIG.—4

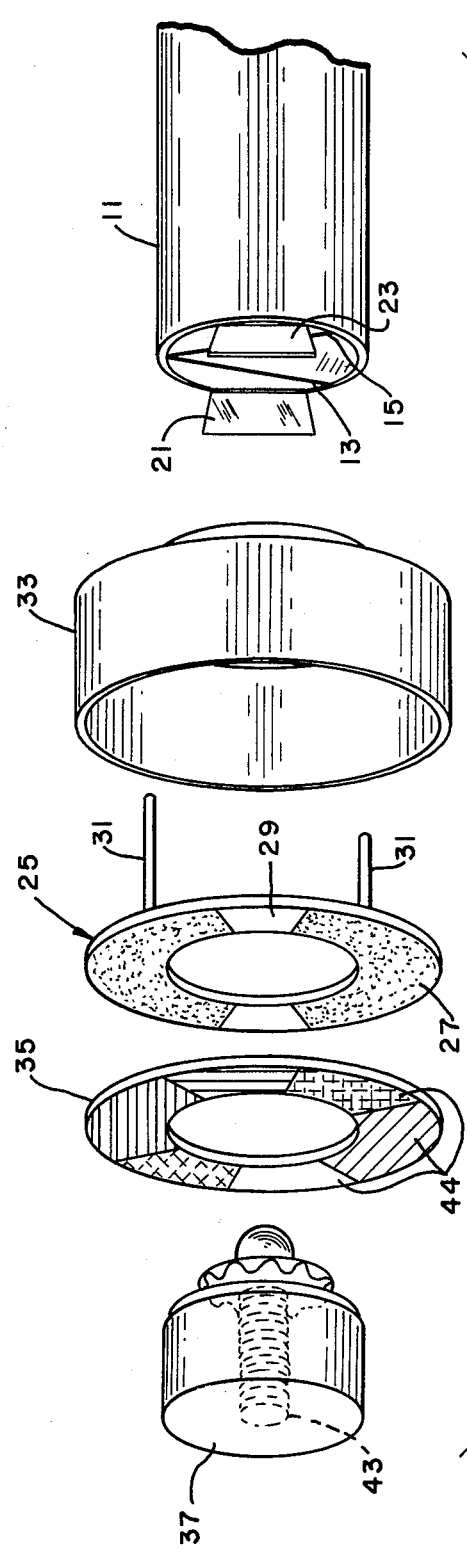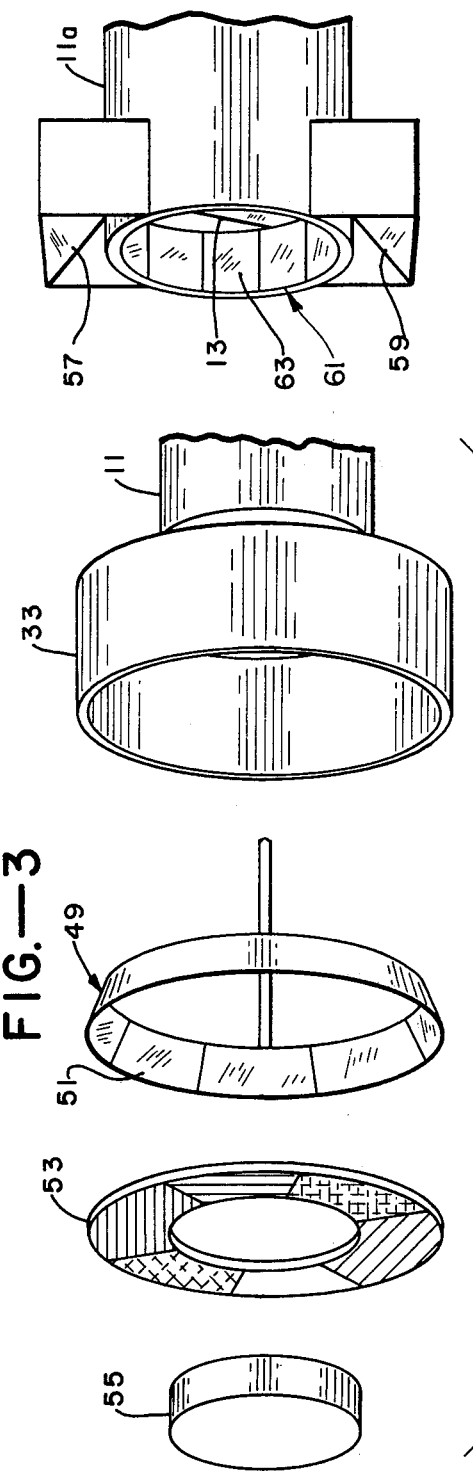

3,990,772

KALEIDOSCOPE

BACKGROUND OF THE INVENTION

Kaleidoscopes have been a popular novelty for many years and in the most usual version of the kaleidoscope there is a cylindrical chamber which carries bits of colored glass. One end of the chamber ordinarily includes a translucent window while the other end is enclosed by a clear window. The chamber is rotatably secured at the end of a reflecting tube which carries a pair of mirrors set at angles to each other. Light is passed through the cylindrical chamber and the bits of colored glass and reflected back and forth along the angled mirrors to an eye piece at the opposite end of the reflecting tube. Rotation of the chamber causes relocation of the glass and thereby provides continuously changing patterns.

Variations of the kaleidoscope have been provided such that the colors of the patterns are not exclusively by means of the colored glass bits but might be somewhat determined by a colored disc disposed in front of the translucent end of the cylinder. In such a variation the pattern is viewed in color but upon a background of substantially the same color.

SUMMARY OF THE INVENTION AND OBJECTS

The invention is incorporated in a kaleidoscope having the usual reflecting tube. The object chamber, however, which carries material to cause variations in the patterns depicted, has an opaque end plate and light is reflected into the object box and may be selected in color. The object box may include reflective particles or devices and is preferably formed with a black background, although the complete reverse, that is, a reflective background with black particles may be equally well employed.

It is a general object of the present invention to provide an improved kaleidoscope wherein the object chamber is darkened except for selectively colored light. The object box includes objects or devices which provide a varying pattern in the kaleidoscope and such objects or devices and the background of the object box are contrasting in that one is reflective and the other is opaque or black.

BRIEF DESCRIPTION OF THE DRAWING

FIG. 1 is a perspective view of a kaleidoscope in accordance with one embodiment of the invention;

FIG. 2 is a sectional view taken along the lines 2—2 of FIG. 1;

FIG. 3 is an exploded view of the end of the kaleidoscope shown in FIG. 1;

FIG. 4 is a sectional view similar to FIG. 2 but showing an alternative embodiment of the invention;

FIG. 5 is an exploded view similar to FIG. 3, but showing still another alternative embodiment of the invention; and FIG. 6 is a partial perspective view showing still another embodiment of the invention.

DETAILED DESCRIPTION OF THE PREFERRED EMBODIMENT

Referring to FIGS. 1, 2 and 3 there is shown a single embodiment of the invention including a hollow reflecting tube 11 having the usual mirrors 13 and 15 joined together and forming a dihedral angle at the top of the tube as shown in FIG. 1. One end 17 of the tube 11 includes an eye opening 19 through which an image reflected by the mirrors 13 and 15 may be viewed. To this extent the kaleidoscope does not differ from that ordinarily found in the prior art and the view at the eye opening 19 is the usual symmetrical pattern.

At the opposite end of the tube 11 are fixed a pair of mirrors 21 and 23, which, as best seen in FIG. 2, are disposed at an angle to the longitudinal axis of the tube 11. A shutter disc 25, having opaque and transparent sections 27 and 29, respectively is also disposed at the end of the tube 11. The shutter disc 25 may be held in place by means of standards 31 secured to the tube 11. All the parts heretofore mentioned are fixed with respect to each other.

A rotatable carriage 33 is retained at the end of the tube 11 and carries with it a color disc 35, together with an opaque end chamber or object box 37. The object box 37 carries within it the reflective device comprising a highly polished ball (such as a ball bearing) and a polished collar 41 mounted on a relatively light spring 43 which permits vibration with very slight movement of the box 37. As the carriage 33 is rotated various colored portions 44 of the disc 35 are aligned with transparent portions 29 of the shutter disc 25. Colored light, then, is transmitted to the mirrors 21 and 23, reflected onto the surfaces 39 and 41 and then to the tube mirrors 13 and 15 to provide a kaleidoscopic effect.

Due to the vibrative mounting of the reflective devices 39 and 41 on the spring 43, the kaleidoscopic effect continuously changes with very slight movement of the tube. Moreover, still additional variations are caused when the reflective collar 41 is permitted to rotate freely about the axis of the spring 43 and ball 39.

Referring to FIG. 4 an alternative embodiment of the invention is shown wherein the object box 37' includes not only the opaque outer wall but a transparent inner wall 47. Within the object box 37' are disposed a number of reflective particles 45.

Again, light is passed through the color disc 35 and transparent portions 29 of the shutter disc 25. The reflected light is picked up by the reflective particles 45 and, as in the previous embodiment, to the tube members 13 and 15 to provide the kaleidoscopic effect.

Referring now to FIG. 5, still another embodiment of the invention is shown in exploded view wherein there is included a mirror assembly 49 which is fixed with respect to the tube 11. The mirror assembly 49 includes multiple sections of variously tinted mirrors 51, each of which predominantly reflects a particular color. Again, there is employed a shutter disc 53 and the object box 55 which may be of the type either as shown in FIG. 2 or FIG. 4.

In the embodiment of the invention shown in FIG. 5 the particular color of light selected to be transmitted to the object box 55 is determined by the mirror 49 itself rather than by a separate color disc as in the preceding embodiments. By utilizing mirrors, rather than a colored filter glass, as shown in FIG. 1, even more intense coloring is possible since the light passes through and is filtered by the colored glass of the mirror twice as it passes toward and away from the reflective backing of the mirror.

Referring now to FIG. 6, still another alternative embodiment of the invention is shown wherein the tube 11a is somewhat extended. The upper and lower portions of the extended tube 11a carry mirrors 57 and 59 and rotatably receive a color tube 61 made up of various colored segments 63. The extension of the tube 11a, juxtaposed to the mirrors 57 and 59 is open, whereby light from the mirrors 57 and 59 may be passed through the adjacent segment 63 of the color tube 61. Although not shown in FIG. 6, an object box similar to any of those shown in the previous embodiments is secured at the open end of the color tube 61. Light reflected from the mirror 57 and 59, and through the segments 63 is directed to the reflective surfaces within the object box and back toward the tube mirrors 13 and 15. Rather than fixing the mirrors 57 and 59 on the extended tube 11a, the color tube itself could be so fixed and the mirrors 57 and 59 (as well as the connecting cylindrical wall portions of the extended tube 11a) could be rotated about the color tube to create the same effect.

Thus, it is seen that an improved kaleidoscope is provided wherein the contrast of colored reflective light against a black background or vice versa is permitted. The contrasting colors from the selectively limited incoming light against the reflective surface is greatly enhanced by the contrast of the black non-reflecting surface. This is in distinction to the usual kaleidscopic method wherein light is passed through the translucent object box and colored glass particles such that the overall effect is a colored display against a general white background.

What is claimed is:

1. A kaleidoscope comprising a reflecting tube, an object box secured at one end of said reflecting tube, the interior of said object box being visably open to said reflecting tube, the sides of said object box remote from said reflecting tube being opaque, reflective means within said object box, mirror means juxtaposed the side of said object box visably open to said reflecting tube, said mirror means being in the path of light from outside said object box and reflecting tube to the interior of said object box, and filter means retained by said reflecting tube for passing light of a predetermined color toward said reflective means.

2. A kaleidoscope as defined in claim 1, wherein the interior of said object box is colored black.

3. A kaleidoscope as defined in claim 1, wherein said reflective means includes a plurality of reflective particles retained in said object box for free movement therein.

4. A kaleidoscope as defined in claim 1, wherein said reflective means comprises a reflective coating on the interior of said object box, together with a plurality of opaque particles retained in said object box for free movement therein.

5. A kaleidoscope as defined in claim 1, wherein said filter means comprises a plurality of colored transparent elements and means for positioning at least one of said elements in the path of light toward said reflective means.

6. A kaleidoscope as defined in claim 5, together with a reflective mirror surface being disposed at one surface of said transparent elements.

7. A kaleidoscope comprising a reflecting tube, an object box secured at one end of said reflecting tube, the interior of said object box being visably open to said reflecting tube, the sides of said object box remote from said reflecting tube being opaque, reflective means within said object box, said reflective means including a reflective surface and spring connecting said reflective surface to said object box, and filter means retained by said reflecting tube for passing light of a predetermined color toward said reflecting means.

8. A kaleidoscope comprising a reflecting tube, an object box secured at one end of said reflecting tube, the interior of said object box being visably open to said reflecting tube, the sides of said object box remote from said reflecting tube being opaque, reflective means within said object box, filter means retained by said reflecting tube for passing light of a predetermined color toward said reflective means, said filter means including a plurality of colored transparent elements disposed in the form of an annular disc, means for positioning at least one of said colored transparent elements in the path of light toward said reflective means and a mirror disposed in the light path between said disc and said reflective means for directing light from said disc to the reflective means.

9. A kaleidoscope comprising a reflecting tube, an object box secured at one end of said reflecting tube, the interior of said object box being visably open to said reflecting tube, the sides of said object box remote from said reflecting tube being opaque, reflective means within said object box, filter means retained by said reflecting tube for passing light of a predetermined color toward said reflective means, said filter means including a plurality of colored transparent elements disposed in the form of a cylindrical tube, means for positioning at least one of said colored transparent elements in the path of light toward said reflective means for directing light from said filter means to the reflective means.

10. A kaleidoscope comprising a reflecting tube, an object box rotatably secured at one end of said reflecting tube, the interior of said object box being visably open to said reflecting tube, the sides of said object box remote from said reflecting tube being opaque, reflective means within said object box, and mirror means juxtaposed the side of said object box visably open to said reflecting tube, said mirror means being in the path of light from outside said object box and reflecting tube to the interior of said object box.

11. A kaleidoscope as defined in claim 10, wherein the interior of said object box is colored black.

12. A kaleidoscope as defined in claim 10, wherein said reflective means comprises a reflective surface, and spring means connecting said reflective surface to said object box.

13. A kaleidoscope as defined in claim 10, wherein said reflective means includes a plurality of reflective particles retained in said object box for free movement therein.

14. A kaleidoscope as defined in claim 10, wherein said reflective means comprises a reflective coating on the interior of said object box, together with a plurality of opaque particles retained in said object box for free movement therein.

* * * * *